United States Patent
Hotta et al.

(10) Patent No.: US 8,184,519 B2
(45) Date of Patent: May 22, 2012

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

(*) Notice: Subject to any disclaimer, the term of this patent is extended or adjusted under 35 U.S.C. 154(b) by 568 days.

(21) Appl. No.: 12/358,727

(22) Filed: Jan. 23, 2009

(65) Prior Publication Data
US 2009/0196146 A1 Aug. 6, 2009

(30) Foreign Application Priority Data

Jan. 25, 2008 (JP) .................. 2008-014590
Feb. 8, 2008 (JP) .................. 2008-028343

(51) Int. Cl.
*G11B 7/00* (2006.01)

(52) U.S. Cl. ............. 369/112.23; 369/44.32; 369/44.25; 369/44.27

(58) Field of Classification Search .................. None
See application file for complete search history.

(56) References Cited

U.S. PATENT DOCUMENTS

| 5,875,164 A * | 2/1999 | Yamakawa et al. ........ 369/44.29 |
| 6,339,562 B1 * | 1/2002 | Sakai .......................... 369/44.23 |
| 2002/0126588 A1 * | 9/2002 | Katayama ................... 369/44.23 |
| 2003/0218949 A1 * | 11/2003 | Katayama ................... 369/53.19 |

FOREIGN PATENT DOCUMENTS

| JP | 2007-042236 | 2/2007 |
| JP | 2009-140529 | 6/2009 |
| WO | WO 2006/004081 | 1/2006 |

OTHER PUBLICATIONS

Japanese Office Action for Application No. 2008-014590, dated Feb. 14, 2012 (3 pages).
Japanese Office Action for Application No. 2008-028343, dated Feb. 21, 2012 (3 pages).

* cited by examiner

*Primary Examiner* — Van Chow
(74) *Attorney, Agent, or Firm* — Fish & Richardson P.C.

(57) ABSTRACT

An optical pickup apparatus comprising: a diffraction grating that a laser beam enters, the diffraction grating being configured to generate a main beam that is 0th order light and sub-beams that are +1st order diffracted light and −1st order diffracted light; an objective lens configured to focus the main beam and the sub-beams onto a signal recording layer; a main-beam light-receiving portion that the main beam reflected by the signal recording layer is applied to; and sub-beam light-receiving portions that the sub-beams reflected by the signal recording layer are respectively applied to, each light-receiving area of the sub-beam light-receiving portions being smaller than a light-receiving area of the main-beam light-receiving portion.

8 Claims, 7 Drawing Sheets

OPTICAL PICKUP APPARATUS

CROSS-REFERENCE TO RELATED APPLICATIONS

This application claims the benefit of priority to Japanese Patent Application Nos. 2008-14590 and 2008-28343, filed Jan. 25, 2008 and Feb. 8, 2008, respectively, of which full contents are incorporated herein by reference.

BACKGROUND OF THE INVENTION

1. Field of the Invention

The present invention relates to an optical pickup apparatus performing operations for reading signals recorded in optical discs 2. Description of the Related Art Optical disc apparatuses are widely used each of which may apply a laser beam emitted from an optical pickup apparatus to a signal recording layer provided in an optical disc to perform a signal reading operation.

An operation of reading signals recorded on the signal recording layer by an optical disc apparatus is performed by applying a laser beam emitted from a laser diode to the signal recording layer and detecting changes in the laser beam reflected from the signal recording layer with a photodetector.

In reading signals recorded on the signal recording layer with a laser beam, accurate executions is needed of a focusing control operation of focusing the laser beam onto the signal recording layer and the tracking control operation of causing the laser beam to follow a whorl-like signal track provided on the signal recording layer.

Although various methods exist for executing the focusing control operation, an astigmatic method utilizing generation of astigmatism is generally known. Although various tracking control methods also exist, a push-pull method and a phase difference method are generally known. Recently, a laser beam emitted from the laser diode is split into three beams, i.e., a main beam and two sub-beams, through diffraction by a diffraction grating, and focusing control methods and tracking control methods using not only the main beam but also the sub-beams are the mainstream.

Recent optical pickup apparatuses use such a main beam and sub-beams to employ a differential astigmatic method as the focusing control method and to employ a differential push-pull method and differential phase difference method as the tracking control method. When such a main beam and sub-beams are used, the optical pickup apparatus is provided with a photodetector including two sub-beam light-receiving portions to which two sub-beams are respectively applied and a main beam light-receiving portion to which a main beam is applied, and is configured to perform control operations by generating a focus error signal and a tracking error signal from signals obtained from the photodetector. Such a technology is well-known and will not be described.

Recently, optical discs provided with two layers instead of one layer are commercialized, and optical pickup apparatuses are also commercialized that are capable of performing operations of reading signals recorded on the signal recording layers of such optical discs.

When performing the operation of reading signals recorded on a two-layer optical disc, the focusing control operation and the tracking control operation are performed for one signal recording layer being subjected to the reading operation, however, the laser beam is also reflected from the other signal recording layer that is not subjected to the reading operation. The laser beam reflected from the signal recording layer not being subjected to the reading operation is generally referred to as stray light, and it is problematic that such stray light is applied to a photodetector generating a focus error signal to be used for the focusing control operation using the differential astigmatic method, and is caused to generate offsets or amplitude variations in the focus error signal, and thus the focusing control operation cannot accurately be performed.

A method for solving such a problem of stray light has been developed, whereby a shape of the photodetector is changed into a shape for eliminating an effect of stray light (see Japanese Patent Application Laid-Open Publication No. 2007-42236).

Although an art disclosed in the above Japanese Patent Application Laid-Open Publication No. 2007-42236 restrains the effect of stray light on a multi-layer optical disc provided with a plurality of signal recording layers, an area of a light-receiving portion for receiving the main beam is set to be substantially the same as an area of a light-receiving portion for receiving the sub-beams, and thus, the art is easily affected by the stray light generated from the main beam, which is a problem.

The focusing control operation in the optical disc apparatus is performed through a combination of an operation of greatly displacing the objective lens included in the optical pickup apparatus to an operational position, i.e., a position for focusing the laser beam onto the signal recording layer and a following operation of minutely displacing a position of an objective lens to correct focusing deviation caused by plane vibrations of the optical disc.

When the objective lens is displaced to the operational position in such a focusing control operation, since a laser spot is greatly expanded that is applied to the sub-beam light-receiving portions and the main beam light-receiving portion included in the photodetector, a spot of an unnecessary laser beam, especially, the main beam with higher light intensity is applied to the sub-beam light-receiving portions, and thus, the focusing control operation is adversely affected, which is a problem.

SUMMARY OF THE INVENTION

An optical pickup apparatus according to an aspect of the present invention, comprises: a diffraction grating that a laser beam enters, the diffraction grating being configured to generate a main beam that is 0th order light and sub-beams that are +1st order diffracted light and −1st order diffracted light; an objective lens configured to focus the main beam and the sub-beams onto a signal recording layer; a main-beam light-receiving portion that the main beam reflected by the signal recording layer is applied to; and sub-beam light-receiving portions that the sub-beams reflected by the signal recording layer are respectively applied to, each light-receiving area of the sub-beam light-receiving portions being smaller than a light-receiving area of the main-beam light-receiving portion.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
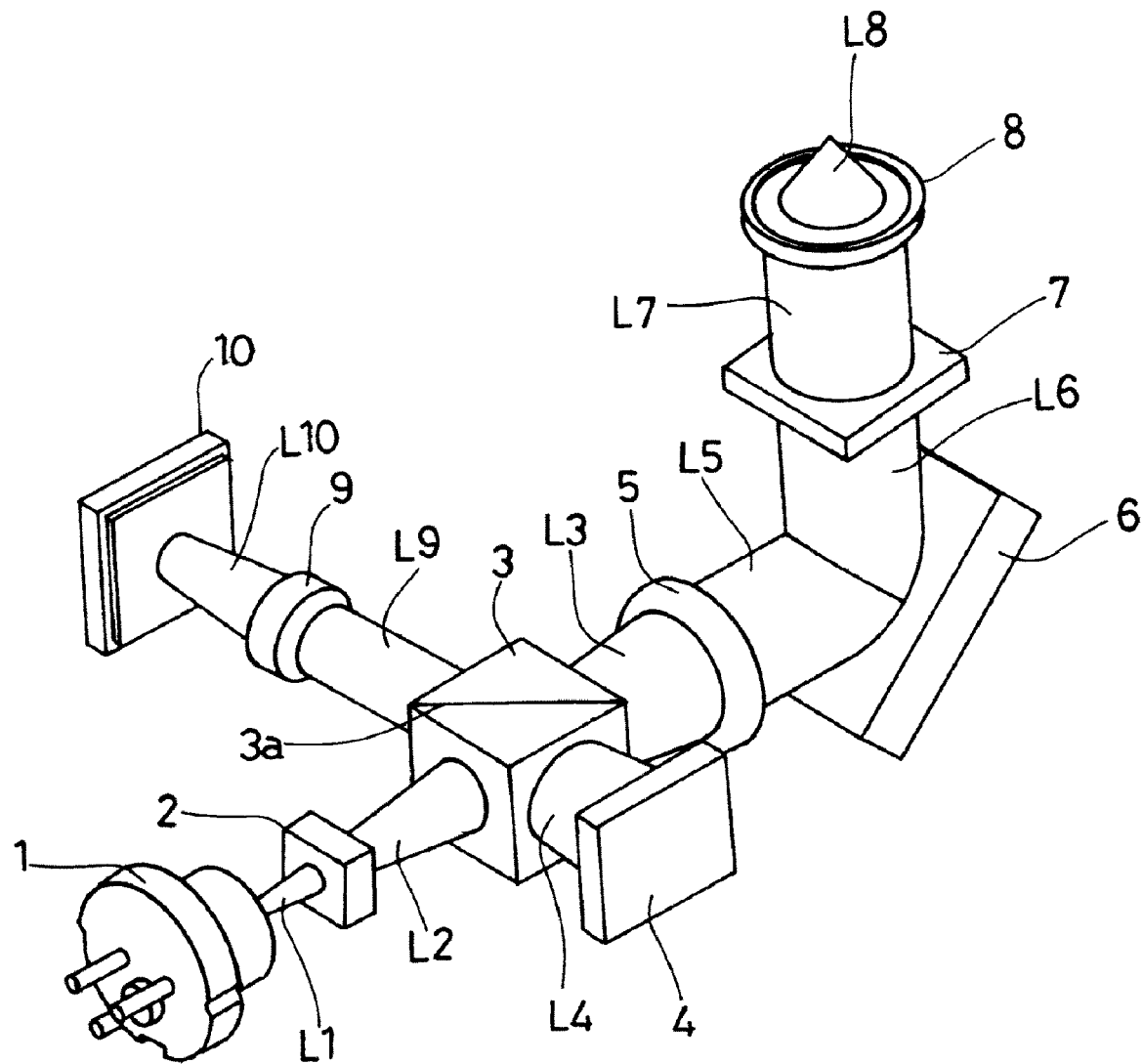
FIG. 1 is a perspective view of a main part of an optical pickup apparatus according to an embodiment of the present invention.

At least the following details will become apparent from descriptions of this specification and of the accompanying drawings.

An optical pickup apparatus according to an embodiment of the present invention includes: an objective lens that focuses a laser beam onto a signal recording layer to read signals recorded in an optical disc; a diffraction grating that the laser beam is applied to and that generates a main beam which is 0th order light and sub-beams which are +1st order diffracted light and −1st order diffracted light; and a photodetector includes sub-beam light-receiving portions that the sub-beams reflected from the signal recording layer is applied to and that generate a tracking error signal, and each of which is made up of a four-divided sensor, and a main-beam light-receiving portion that the main beam reflected from the signal recording layer is applied to and that generates a reproduction signal and a focus error signal, and that is made up of a four-divided sensor, wherein each light-receiving area of the sub-beam light-receiving portions is rendered smaller than a light-receiving area of the main-beam light-receiving portion.

The optical pickup apparatus according to an embodiment of the present invention includes: the objective lens that focuses the laser beam onto the signal recording layer to read signals recorded in the optical disc; the diffraction grating that the laser beam enters and that generates the main beam which is 0th order light and the sub-beams which are +1st order diffracted light and −1st order diffracted light; and the photodetector includes the sub-beam light-receiving portions which the sub-beams reflected from the signal recording layer is applied to, which generate the tracking error signal, and each of which is made up of the four-divided sensor, and the main-beam light-receiving portion that the main beam reflected from the signal recording layer is applied to, that generates the reproduction signal and the focus error signal, and that is made up of the four-divided sensor, wherein the sub-beam light-receiving portions and the main-beam light-receiving portion are disposed side by side in the tracking control direction, and wherein the each light-receiving area of the sub-beam light-receiving portions is rendered smaller than the light-receiving area of the main-beam light-receiving portion, and wherein a ratio between the length of the sub-beam light-receiving portions in the tracking control direction and the length of the main-beam light-receiving portion in the tracking control direction is set to a predetermined value.

In an embodiment of the present invention, the ratio between the length of the sub-beam light-receiving portions in the tracking control direction and the length of the main-beam light-receiving portion in the tracking control direction is set based on an amount of reduction in a light reception amount of the sub-beams associated with displacement in the tracking direction.

In an embodiment of the present invention, the length of the sub-beam light-receiving portions in a direction orthogonal to the tracking control direction is rendered substantially the same as the diameter of the sub-beams.

In an embodiment of the present invention, each of the sub-beam light-receiving portions is in an octagonal shape instead of a rectangular shape.

In an embodiment of the present invention, each of the sub-beam light-receiving portions is in a shape elongated in the tracking control direction.

In an embodiment of the present invention, the focus error signal is generated from signals obtained from the sub-beam light-receiving portions and the main-beam light-receiving portion.

In an embodiment of the present invention, each shape of the sub-beam light-receiving portions is made similar to a shape of a sub-beam. A shape of the sub-beam is indicated a shape of a spot formed by each of the sub-beams applied to the sub-beam light-receiving portions.

In an embodiment of the present invention, the light-receiving area of each of the sub-beam light-receiving portions is rendered smaller than the light-receiving area of the main-beam light-receiving portion in the optical pickup apparatus provided with the photodetector including the sub-beam light-receiving portions each of which made up of the four-divided sensor, and the main-beam light-receiving portion made up of the four-divided sensor, and thus, the light reception amount of stray light to be applied to the sub-beam light-receiving portion may be reduced. Therefore, the optical pickup apparatus according to an embodiment of the present invention may precisely perform the focusing control operation utilizing signals obtained from the sub-beam light-receiving portions.

The optical pickup apparatus according to an embodiment of the present invention provided with the photodetector including the sub-beam light-receiving portions each of which made up of the four-divided sensor and the main-beam light-receiving portion that the main beam reflected from the signal recording layer is applied to, that generates the reproduction signal and the focus error signal, and that is made up of the four-divided sensor, wherein the sub-beam light-receiving portions and the main-beam light-receiving portion are disposed side by side in the tracking control direction, and wherein the light-receiving area of each of the sub-beam light-receiving portions is made smaller than the light-receiving area of the main-beam light-receiving portion, and wherein the ratio between the length of the sub-beam light-receiving portions in the tracking control direction and the length of the main-beam light-receiving portion in the tracking control direction is set to a predetermined value, and thus, the light reception amount of the stray light to be applied to the sub-beam light-receiving portions may be reduced to a minimum. Therefore, according to an embodiment of the present invention, the focusing control operation may precisely be performed utilizing signals obtained from the sub-beam light-receiving portions.

In the optical pickup apparatus according to an embodiment of the present invention, the ratio between the length of the sub-beam light-receiving portion in the tracking control direction and the length of the main-beam light-receiving portion in the tracking control direction is set based on the amount of the reduction in the light reception amount of the sub-beam associated with the displacement in the tracking direction, and thus, the photodetector may be made up which is not affected by the stray light while satisfying characteristics required for the optical pickup apparatus.

In the optical pickup apparatus according to an embodiment of the present invention, the length of the sub-beam light-receiving portions in a direction orthogonal to the tracking control direction is made substantially the same as the diameter of the sub-beam, and thus, the area of each of the sub-beam light-receiving portions may be reduced to the minimum necessary and the adverse effect of the stray light may be reduced to the minimum.

In the optical pickup apparatus according to an embodiment of the present invention, each of the sub-beam light-receiving portions is in an octagonal shape so that a structure becomes simple, and thus, an increase in manufacturing cost may be restrained.

In the optical pickup apparatus according to an embodiment of the present invention, each of the sub-beam light-receiving portions is in a shape elongated in the tracking control direction so that a spot of the sub-beam may be maintained within a range of the light-receiving portion even when a spot of the laser beam is displaced in the tracking direction, and thus, the focusing control operation may precisely be performed.

In the optical pickup apparatus according to an embodiment of the present invention, the focus error signal is generated from signals obtained from the sub-beam light-receiving portions and the main-beam light-receiving portion, and thus, the focusing control operation may precisely be performed.

In the optical pickup apparatus according to an embodiment of the present invention, each of the sub-beam light-receiving portions is in a shape similar to the shape of the sub-beam, and thus, the effect of unnecessary laser beam may be reduced to the minimum.

Hereinafter, an embodiment of the present invention will be described with reference to the drawings.

A configuration of the optical pickup apparatus will first be described with reference to FIG. 1. In FIG. 1, reference numeral 1 denotes a laser diode that emits a laser beam L1 having an output corresponding to a drive signal supplied from a laser drive circuit, and the laser beam L1 is oval in cross section.

Reference numeral 2 denotes a diffraction grating that the laser beam L1 emitted from the laser diode 1 enters and that generates and emits a laser beam L2 made up of a main beam which is 0th order light and sub-beams which are +1st order diffracted light and −1st order diffracted light.

Reference numeral 3 denotes a polarizing beam splitter that the laser beam L2 emitted from the diffraction grating 2 enters and that is provided with a reflection film 3a allowing a laser beams L3 for being applied to an optical disc D to pass therethrough and reflecting a monitor laser beam L4 to be applied to a front-monitor diode 4 provided to control an output of the laser beam. The reflection film 3a is made up so as to reflect return light reflected by the optical disc D as a control laser beam as will be described later.

Reference numeral 5 denotes a collimating lens that the laser beam L3 having passed through the reflection film 3a of the polarizing beam splitter 3 enters, and that converts the incident laser beam L3 into a laser beam L5 which is parallel light. Reference numeral 6 denotes a reflection mirror that the laser beam L5 impinges on, and that reflects the laser beam L5 entirely as a laser beam L6 in a direction of the optical disc D. Such a reflection mirror 6 is generally referred to as a raising mirror.

Reference numeral 7 denotes a quarter-wave plate that the laser beam L6 reflected from the reflection mirror 6 enters and that creates a quarter-wavelength phase shift in the laser beam L6 by a quarter wavelength. Reference numeral 8 denotes an objective lens that a laser beam L7 having passed through the quarter-wave plate 7 enters and that focuses the laser beam as a laser beam L8 on the signal recording layer included in the optical disc D. The objective lens 8 is made up so as to perform the focusing control operation through displacement movements in a direction perpendicular to the signal surface of the optical disc D and the tracking control operation through displacement movements in the radial direction of the optical disc D. The objective lens performing such operations is provided displaceably in the focusing control direction and the tracking control direction by four support wires, for example, however, such a configuration is well-known and will not be described.

The laser beam L8 applied by the objective lens 8 to the signal recording layer of the optical disc D is made incident on the objective lens 8 as the return light reflected from the signal recording layer. The return light having been made incident on the objective lens 8 is made incident on the polarizing beam splitter 3 through the quarter-wave plate 7, the reflection mirror 6, and the collimating lens 5.

As described above, since the return light made incident on the polarizing beam splitter 3 passes through the quarter-wave plate 7 in a reciprocating manner, i.e., twice, a phase of the return light is shifted by a half wavelength as is well known. When the above phase-shifted return light is made incident on the polarizing beam splitter 3, the return light is reflected as a control laser beam L9 by the reflection film 3a formed in the polarizing beam splitter 3.

Reference numeral 9 denotes a sensor lens that the control laser beam L9 reflected by the reflection film 3a of the polarizing beam splitter 3 enters and that applies the control laser beam L9 as a concentrated laser beam L10 onto a light-receiving portion included in a photodetector 10 called PDIC. The sensor lens 9 includes a cylindrical lens, etc., and is made up so as to generate astigmatism for performing the focusing control operation using the astigmatic method, however, this is well-known and will not be described.

In the optical pickup apparatus shown in FIG. 1, the laser beam L1 emitted from the laser diode 1 is made incident on the objective lens 8 through the diffraction grating 2, the polarizing beam splitter 3, the collimating lens 5, the reflection mirror 6, and the quarter-wave plate 7, to be applied onto the signal recording layer of the optical disc D through the focusing operation of the objective lens 8.

The laser beam L8 applied to the signal recording layer is reflected and made incident on the objective lens 8 as the return light. The return light having been made incident on the objective lens 8 is made incident on the polarizing beam splitter 3 through the quarter-wave plate 7, the reflection mirror 6, and the collimating lens 5.

The return light having been made incident on the polarizing beam splitter 3 is reflected as the control laser beam L9 by the reflection film 3a included in the polarizing beam splitter 3. The control laser beam L9 obtained in this way is made incident on the sensor lens 9 and is applied as the concentrated laser beam L10 to the light-receiving portion included in the photodetector 10.

Figure 3:
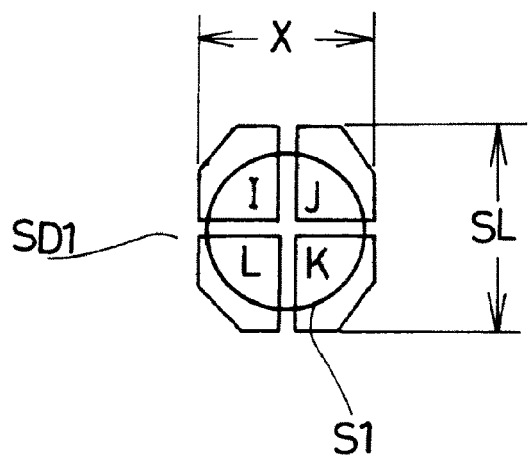
FIG. 3 is a diagram for explaining a relationship between a photodetector included in an optical pickup apparatus and a laser beam according to an embodiment of the present invention.
Figure 3:
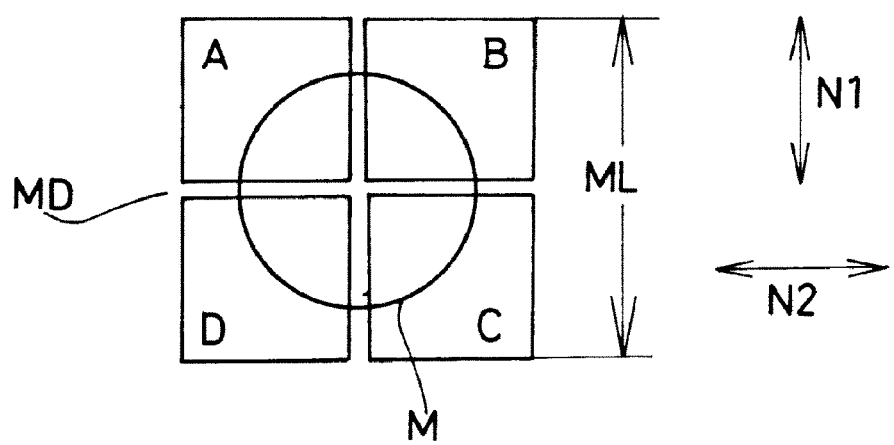
Figure 3:
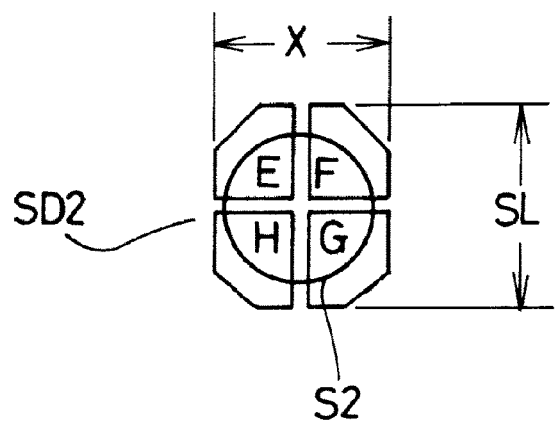

The light-receiving portion included in the photodetector 10 is made up of a main-beam light-receiving portion MD that a main beam M, i.e., 0th order light, is applied to and that is used for a signal reproduction operation and the focusing control operation, a preceding sub-beam light-receiving portion SD1 that a preceding sub-beam S1, i.e., +1st order diffracted light, is applied to and that is used for the tracking control operation, and a succeeding sub-beam light-receiving portion SD2 that a succeeding sub-beam S2, i.e., −1st order diffracted light is applied to and that is used for the tracking control operation, as shown in FIG. 3.

The photodetector 10 is provided with the main-beam light-receiving portion MD, the preceding sub-beam light-receiving portion SD1, and the succeeding sub-beam light-receiving portion SD2 as above, which are arranged in a direction identical to the tracking direction, i.e., a direction of displacement of the main beam M, the preceding sub-beam S1, and the succeeding sub-beam S2 applied to the main-beam light-receiving portion MD, the preceding sub-beam light-receiving portion SD1, and the succeeding sub-beam light-receiving portion SD2 when the spot focused with the objective lens 8 is displaced in the radial direction of the optical disc D.

Each of the main-beam light-receiving portion MD, the preceding sub-beam light-receiving portion SD1, and the succeeding sub-beam light-receiving portion SD2 is made up of a four-divided sensor as shown. A configuration is made such that a signal recorded in the optical disc D is read as a reproduction signal by adding signals corresponding to light amounts of the main beam applied to all the sensors A, B, C, an D making up the main-beam light-receiving portion MD, however, such an operation is well-known and will not be described.

A focus error signal is generated by adding signals obtained from sensors in one diagonal relationship in the four-divided sensor making up the main-beam light-receiving portion MD and subtracting from this added signal a signal obtained by adding signals obtained from sensors in the other diagonal relationship, and this focus error signal is used for the focusing control operation, however, such a focusing control operation is a focusing control method called astigmatic method and will not be described.

In contrast to the astigmatic method, a sub-focus error signal is generated by adding signals obtained from sensors in one diagonal relationship in each of the four-divided sensors making up the preceding sub-beam light-receiving portion SD1 and the succeeding sub-beam light-receiving portion SD2 and subtracting from this added signal a signal obtained by adding signals obtained from sensors in the other diagonal relationship, and a focus error signal is operated and generated from the sub-focus error signal and a main focus error signal obtained from the four-divided sensor making up the main-beam light-receiving portion MD to perform the focusing control operation, and such a focusing control operation is a control method called differential astigmatic method.

The focusing control operation through the above differential astigmatic method will then be described. This focusing control operation is performed with the use of the main focus error signal and the sub-focus error signals generated from the main-beam light-receiving portion MD, the preceding sub-beam light-receiving portion SD1, and the succeeding sub-beam light-receiving portion SD2 as described above.

The main focus error signal is obtained by adding signals obtained from two sensors A and C of the four-divided sensor making up the main-beam light-receiving portion MD and subtracting from this added signal a signal obtained by adding signals obtained from two sensors B and D.

A first control signal is obtained by adding signals obtained from two sensors I and K of the four-divided sensor making up the preceding sub-beam light-receiving portion SD1 and subtracting from this added signal a signal obtained by adding signals obtained from two sensors J and L; a second control signals is obtained by adding signals obtained from two sensors E and G of the four-divided sensor making up the succeeding sub-beam light-receiving portion SD2 and subtracting from this added signal a signal obtained by adding signals obtained from two sensors F and H; and a sub-focus error signal is obtained by executing an arithmetic processing for the first control signal and the second control signal obtained as above.

The focus error signal obtained by the differential astigmatic method is obtained by subtracting the sub-focus error signal obtained from the preceding sub-beam light-receiving portion SD1 and the succeeding sub-beam light-receiving portion SD2 from the main focus error signal obtained from the main-beam light-receiving portion MD.

The generation operation of such a focus error signal will then be described with reference to the reference characters of the sensor portions shown in FIG. 3. If the main focus error signal is represented by MFE, $MFE=(A+C)-(B+D)$, and if the sub-focus error signal is represented by SFE, $SFE=\{(E+G)-(F+H)\}+\{(I+K)-(J+L)\}$.

Such a focusing control operation using the differential astigmatic method is performed based on a differential astigmatic signal DAS, and this DAS signal is obtained as $DAS=MFE-k1\times SFE$, where k1 is a constant determined based on light intensity of the main beam and light intensity of the sub-beams.

An optical pickup apparatus has been developed which is configured to perform the focusing control operation using the main beam and the sub-beams in combination as above, and the tracking control operation of the optical pickup apparatus having such a configuration will then be described.

A method, which is the so-called differential push-pull method, for example, is employed as such a tracking control operation, and this differential push-pull method is performed by operations of applying the main beam M to the main-beam light-receiving portion MD, applying the preceding sub-beam S1 to the preceding sub-beam light-receiving portion SD1, and applying the succeeding sub-beam S2 to the succeeding sub-beam light-receiving portion SD2.

Such a differential push-pull method uses a main push-pull signal MPP obtained from the main-beam light-receiving portion MD, a first sub-push-pull signal SPP1 obtained from the preceding sub-beam light-receiving portion SD1, and a second sub-push-pull signal SPP2 obtained from the succeeding sub-beam light-receiving portion SD2, and the tracking error signal obtained by the differential push-pull method is obtained by subtracting a sub-tracking error signal STE obtained by adding the sub-push-pull signal SPP1 and the sub-push-pull signal SPP2 from a main tracking error signal MTE that is the main push-pull signal MPP.

Here, the main push-pull signal MPP is obtained by adding signals obtained from the two sensors A and B on the upper side of the four-divided sensor making up the main-beam light-receiving portion MD, and subtracting from this added signal a signal obtained by adding signals obtained from the two sensors C and D on the lower side thereof; the first sub-push-pull signal SPP1 is obtained by adding signals obtained from the two sensors I and J on the upper side of the four-divided sensor making up the preceding sub-beam light-receiving portion SD1 and subtracting from this added signal a signal obtained by adding signals obtained from the two sensors L and K on the lower side thereof; and the second sub-push-pull signal SPP2 is obtained by adding signals obtained from the two sensors E and F on the upper side of the four-divided sensor making up the succeeding sub-beam light-receiving portion SD2 and subtracting from this added signal a signal obtained by adding signals obtained from the two sensors H and G on the lower side thereof.

When description is made with reference to the reference characters of the sensor units as shown, the main tracking error signal is expressed by MTE=MPP=(A+B)−(C+D), and the sub tracking error signal is expressed by STE=SPP1+SPP2={(E+E)−(G+H)}+{(I+J)−(L+K)}.

The tracking control operation using the differential push-pull method is performed based on a differential push-pull signal DPP, and this DPP signal is obtained by DPP=MFE−k2×STE, where k2 is a constant determined based on the light intensity of the main beam and the light intensity of the sub-beams.

An optical pickup apparatus has been developed which performs the tracking control operation using the main beam and the sub-beams in combination as above.

Although the laser beam L1 emitted from the laser diode 1 is made incident on the polarizing beam splitter 3 as the laser beam L2 diffracted by the diffraction grating 2, a portion of an incident laser beam is reflected by the reflection film 3a and applied as the monitor laser beam L4 to the front-monitor diode 4.

The monitor laser beam L4 to be applied to the front-monitor diode 4 varies corresponding to an output level of the laser beam L1 emitted from the laser diode 1. Therefore, a laser servo operation may be performed of controlling the output of the laser beam L1 emitted from the laser diode 1 so as to be at a predetermined value, with feedback of a monitor signal generated by the front-monitor diode 4 to a drive circuit provided for supplying a drive signal to the laser diode 1. Such a laser servo operation is well-known and will not be described.

As described above, the focus error signal and the tracking error signal are generated from signals obtained from the main-beam light-receiving portion MD, the preceding sub-beam light-receiving portion SD1, and the succeeding sub-beam light-receiving portion SD2 to perform the focusing control operation and the tracking control operation based on the focus error signal and the tracking error signal, and the focusing control operation is performed by displacing the objective lens 8 in the direction perpendicular to the signal surface of the optical disc D and the tracking control operation is performed by displacing the objective lens 8 in the radial direction of the optical disc D.

Figure 2:
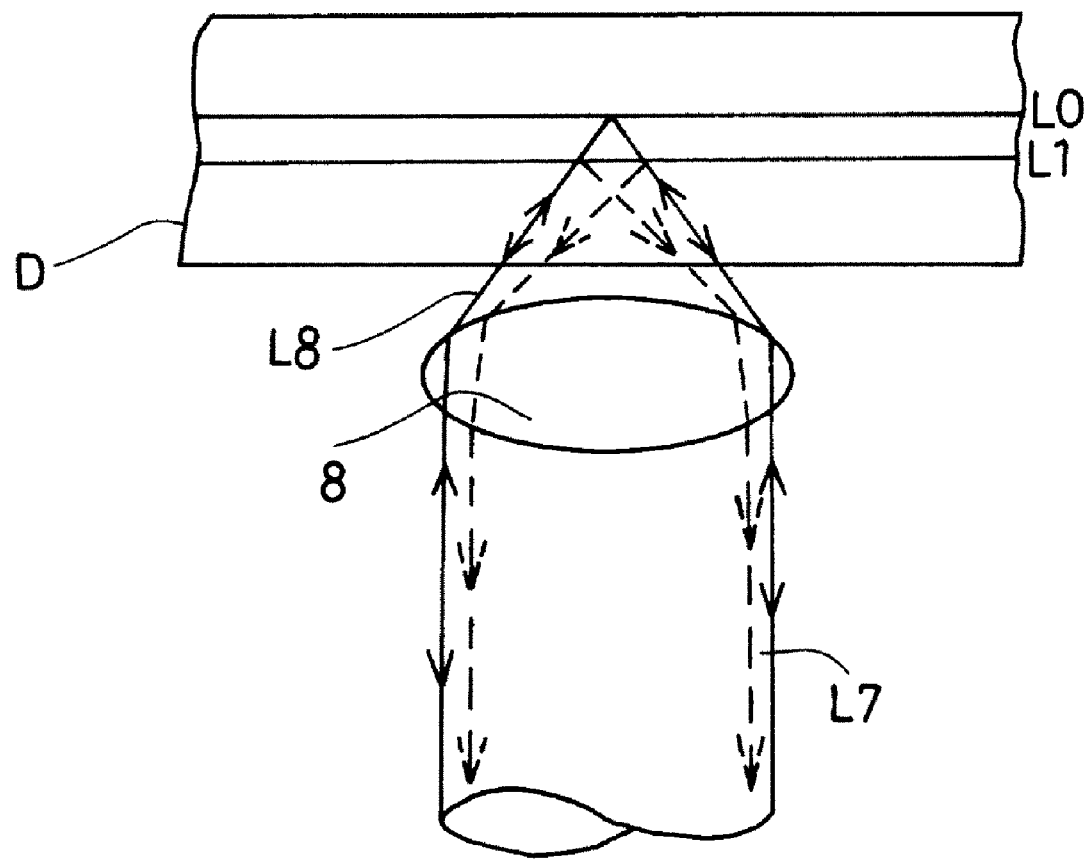
FIG. 2 is a diagram for explaining an operation of an embodiment of the present invention.

FIG. 2 depicts a relationship of a first signal recording layer L0, a second signal recording layer L1 provided in the optical disc D, and an objective lens 8 and shows a state when the laser beam L8 is focused on the first signal recording layer L0 by the focusing control operation. That is, in such a state, the laser beam L8 is focused on the first signal recording layer L0, and the tracking control operation is performed for a signal track provided on the first signal recording layer L0 to perform an operation of reproducing signals recorded on the first signal recording layer L0.

When the operation is performed of reproducing signals recorded on the second signal recording layer L1, the objective lens 8 is displaced to a position lower than that shown in FIG. 2 so that the laser beam L8 is focused onto the second signal recording layer L1, and such a focusing control operation to the signal recording layers is well-known and will not be described.

The optical pickup apparatus according to an embodiment of the present invention is configured as described above, and the gist of an embodiment of the present invention, i.e., a countermeasure against the stray light for the focusing control operation, will then be described.

The adversely affecting operation of the stray light in the optical pickup apparatus will first be described. When the operation is performed of reproducing signals recorded on the first signal recording layer L0 as shown in FIG. 2, the first signal recording layer L0 is in a state where the laser beam L8 is applied thereto which includes the main beam M, the preceding sub-beam S1, and the succeeding sub-beam S2 generated by the diffraction grating 2.

Each of the main beam M, the preceding sub-beam S1, and the succeeding sub-beam S2 is reflected by the first signal recording layer L0 and then is made incident on the reflection film 3a of the polarizing beam splitter 3 through the objective lens 8, the quarter-wave plate 7, the reflection mirror 6, and the collimating lens 5. The laser beam having been made incident in this way is reflected by the reflection film 3a of the polarizing beam splitter 3 and is made incident on the sensor lens 9 as the control laser beam L9, as described above.

The control laser beam L9 having been made incident on the sensor lens 9 is applied as the concentrated laser beam L10 to the light-receiving portion included in the photodetector 10 by condensing function of the sensor lens 9. FIG. 3 depicts a relationship between the concentrated laser beam L10 to be applied as such and the light-receiving portions. As apparent from FIG. 3, the main beam M, the preceding sub-beam S1, and the succeeding sub-beam S2 are applied to the main-beam light-receiving portion MD, the preceding sub-beam light-receiving portion SD1, and the succeeding sub-beam light-receiving portion SD2, respectively.

Since the main beam M, the preceding sub-beam S1, and the succeeding sub-beam S2 are applied to the main-beam light-receiving portion MD, the preceding sub-beam light-receiving portion SD1, and the succeeding sub-beam light-receiving portion SD2, respectively, there are performed the focusing control operation to the first signal recording layer L0 and the tracking control operation to the signal track provided on the first signal recording layer L0. Therefore, the operation may be performed of reproducing signals recorded on the first signal recording layer L0.

Although the laser beam L8 is applied to the first signal recording layer L0 of the optical disc D through the focusing operation of the objective lens 8 as described above, the main beam M out of the laser beam L8 is reflected as the stray light from the second signal recording layer L1 as shown by dashed lines of FIG. 2. The stray light reflected from the second signal recording layer L1 as above is made incident on the reflection film 3a of the polarizing beam splitter 3 through the objective lens 8, the quarter-wave plate 7, the reflection mirror 6, and the collimating lens 5 as is the case with the laser beam reflected from the first signal recording layer L0.

The stray light made incident on the reflection film 3a of the polarizing beam splitter 3 as above is reflected by the reflection film 3a and applied to the light-receiving portion included in the photodetector 10 through the sensor lens 9. Since the stray light is not such a laser beam as to be focused like the reflected light from the first signal recording layer L0, the stray light is not condensed on the light-receiving portion by the sensor lens 9.

Figure 5:
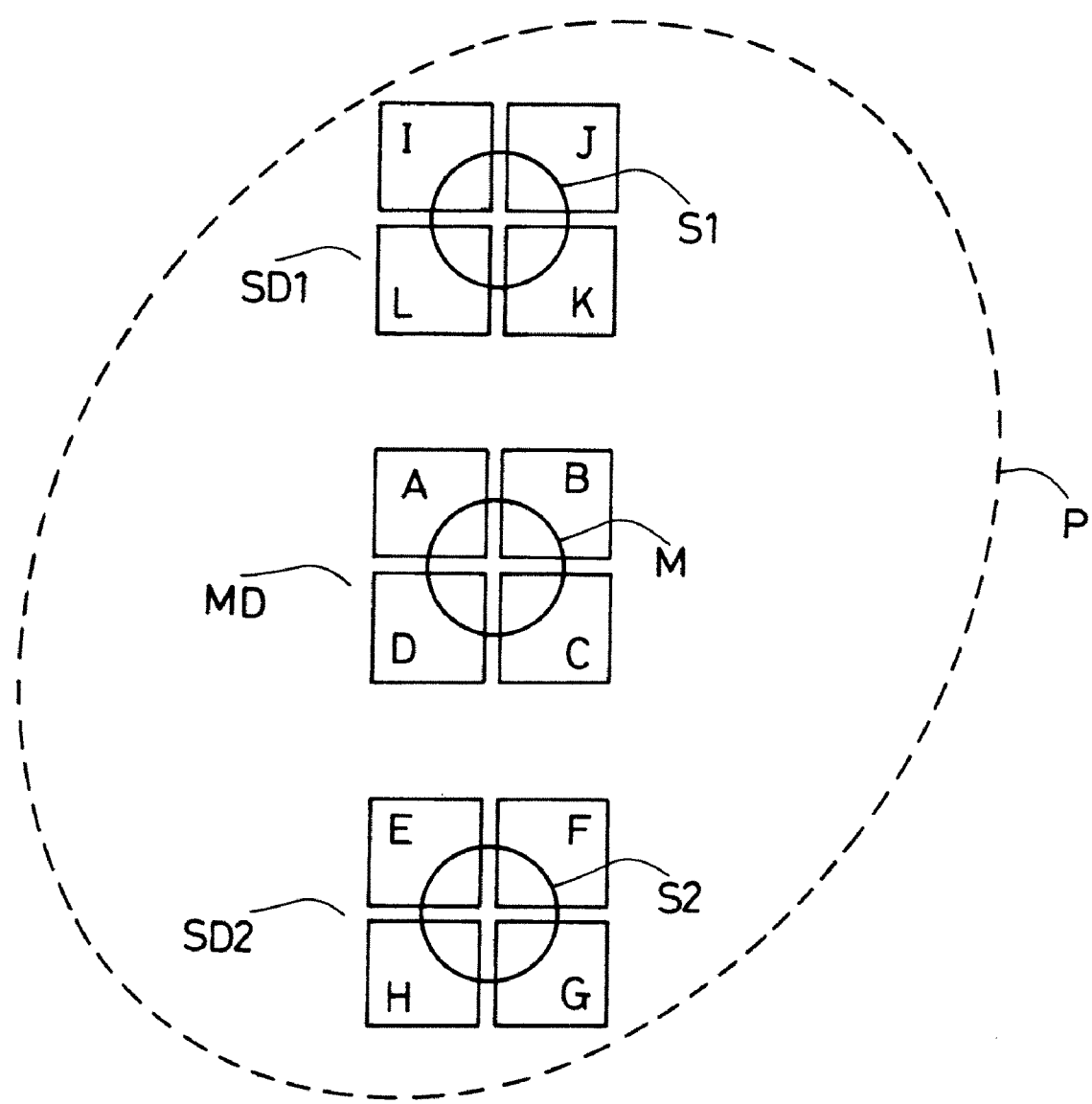
FIG. 5 is a diagram for explaining a relationship between a photodetector included in an optical pickup apparatus and a laser beam.

FIG. 5 depicts a relationship between the main-beam light-receiving portion MD, the preceding sub-beam light-receiving portion SD1, and the succeeding sub-beam light-receiving portion SD2 and the stray light described above, and an inside portion of a circle P shown by a dashed line is an irradiation portion of a stray light beam.

As apparent from FIG. 5, the stray light beam is applied onto the main-beam light-receiving portion MD, the preceding sub-beam light-receiving portion SD1, and the succeeding sub-beam light-receiving portion SD2 included in the photodetector 10.

The 0th order light, i.e., the main beam, and the +1st order diffracted light and −1st order diffracted light, i.e., the sub-beams, are generated by the diffraction grating 2, and the light amount ratio, i.e., a light amount ratio of one sub-beam to the main beam is generally set to about 1:15. Therefore, the light amount of the sub-beams reflected as the stray light from the second signal recording layer L1 is sufficiently small as compared to the light amount of the main beam reflected as the stray light, and thus, an effect on the focusing control operation, etc., may be negligible.

Since the light amount of the main beam M applied to the main-beam light-receiving portion MD is sufficiently larger than the light amount of the stray light beam, no adverse effect is exerted on the signal generation operation of the main-beam light-receiving portion MD, i.e., the operation of reproducing signals recorded on the first signal recording layer L0, the generation operation of the focus error signal, etc.

On the other hand, the light amounts of the preceding sub-beam S1 and the succeeding sub-beam S2 applied to the preceding sub-beam light-receiving portion SD1 and the succeeding sub-beam light-receiving portion SD2 for generating the focus error signal as above are set smaller than the light amount of the main beam M. Therefore, a gain of an amplifier provided to amplify signals obtained from the preceding sub-beam light-receiving portion SD1 and the succeeding sub-beam light-receiving portion SD2 is generally set higher than a gain of an amplifier provided to amplify a signal obtained from the main-beam light-receiving portion MD.

As a result, there is increased an effect that is exerted by applying the stray light generated from the main beam M reflected from the second signal recording layer L1 onto the preceding sub-beam light-receiving portion SD1 and the succeeding sub-beam light-receiving portion SD2. That is, since a signal corresponding to the light intensity of the stray light affects the focus error signal obtained from the preceding sub-beam light-receiving portion SD1 and the succeeding sub-beam light-receiving portion SD2, the precise focus error signal may not be obtained, and thus, the focusing control operation becomes unstable as a result, which is a problem.

To solve this problem, in an embodiment of the present invention, an area of the light-receiving portion of each of the preceding sub-beam light-receiving portion SD1 and the succeeding sub-beam light-receiving portion SD2 is made smaller than an area of the main-beam light-receiving portion MD as shown in FIG. 3. Each of the preceding sub-beam light-receiving portion SD1 and the succeeding sub-beam light-receiving portion SD2 of an embodiment of the present invention has an area smaller than the area of the main-beam light-receiving portion MD, and has an octagonal shape.

The preceding sub-beam light-receiving portion SD1 and the succeeding sub-beam light-receiving portion SD2 are made up so as to have a shape elongated in the tracking control direction, i.e., a direction of an arrow N1 as shown. That is, Since each of the preceding sub-beam light-receiving portion SD1 and the succeeding sub-beam light-receiving portion SD2 is in a shape elongated in the tracking control direction, even if the preceding sub-beam S1 and the succeeding sub-beam S2 applied to the preceding sub-beam light-receiving portion SD1 and the succeeding sub-beam light-receiving portion SD2 are displaced in the direction of the arrow N1 in connection with deviation of tracking or the tracking control operation for correcting the deviation, the preceding sub-beam S1 and the succeeding sub-beam S2 are not deviated from the preceding sub-beam light-receiving portion SD1 and the succeeding sub-beam light-receiving portion SD2, respectively.

In such a configuration, since the preceding sub-beam S1 and the succeeding sub-beam S2 can be located on the preceding sub-beam light-receiving portion SD1 and the succeeding sub-beam light-receiving portion SD2, even if a laser spot is displaced in the tracking direction, the focusing control operation may precisely be performed.

The preceding sub-beam light-receiving portion SD1 and the succeeding sub-beam light-receiving portion SD2 according to an embodiment of the present invention are made up such that a length in the direction orthogonal to the tracking control direction, i.e., a direction of an arrow N2 is rendered to be substantially the same as the diameter of the sub-beams S1 and S2 as shown. In such a configuration, since the areas of the preceding sub-beam light-receiving portion SD1 and the succeeding sub-beam light-receiving portion SD2 may be reduced as much as possible, the adverse effect of the stray light may be reduced to the minimum, and thus, the focusing control operation may precisely be performed.

The main-beam light-receiving portion MD, the preceding sub-beam light-receiving portion SD1, and the succeeding sub-beam light-receiving portion SD2 are made up as above, and a length X of the preceding sub-beam light-receiving portion SD1 and the succeeding sub-beam light-receiving portion SD2 in the N2 direction is set to be substantially the same as the diameters of the sub-beams S1 and S2 as above.

Although a value of the length X of the preceding sub-beam light-receiving portion SD1 and the succeeding sub-beam light-receiving portion SD2 in the N2 direction is set based on the diameters of the sub-beams S1 and S2 as above, setting of a length SL in the tracking control direction represented by the arrow N1 will then be described.

A value of the length SL of the preceding sub-beam light-receiving portion SD1 and the succeeding sub-beam light-receiving portion SD2 in the N1 direction is set in consideration of reduction in the light amounts of the sub-beams S1 and S2 associated with the displacement movements of the objective lens 8 associated with the tracking control operation. That is, the length is set such that the focusing control operation and the tracking control operation can be performed without trouble based on the focus error signal and the tracking error signal, even if levels of signals obtained from the preceding sub-beam light-receiving portion SD1 and the succeeding sub-beam light-receiving portion SD2 are reduced associated with the displacement movements of the objective lens 8.

When it is assumed that P represents a rate of a value of the length SL of the preceding sub-beam light-receiving portion SD1 and the succeeding sub-beam light-receiving portion SD2 in the N1 direction to a value of the length ML of the main-beam light-receiving portion MD in the N1 direction, i.e., P=SL/ML, a value of the rate P is changed in a stepwise manner so that the value can be set of the length SL of the preceding sub-beam light-receiving portion SD1 and the succeeding sub-beam light-receiving portion SD2 in the N1 direction.

That is, a value is changed of the length SL of the preceding sub-beam light-receiving portion SD1 and the succeeding sub-beam light-receiving portion SD2 in the N1 direction while a value is fixed of the length ML of the main-beam light-receiving portion MD in the N1 direction and the focusing control operation is performed using a test disc, so that a value of SL can be set. As a result of experiments conducted by the applicant, it was confirmed that if the value of the rate P is substantially equal to 0.6 or more, the focusing control operation and the tracking control operation may be performed without trouble, even if the light amounts of the sub-beams S1 and S2 are reduced associated with the displacement of the objective lens 8.

If the rate P is set to about 0.6 which is the rate of the length SL of the preceding sub-beam light-receiving portion SD1 and the succeeding sub-beam light-receiving portion SD2 in the N1 direction to the length ML of the main-beam light-receiving portion MD in the N1 direction as above, the length SL of the preceding sub-beam light-receiving portion SD1 and the succeeding sub-beam light-receiving portion SD2 in the N1 direction may be set to the shortest length. As a result, the light-receiving areas of the preceding sub-beam light-receiving portion SD1 and the succeeding sub-beam light-receiving portion SD2 may be minimized within a range where the focusing control operation and the tracking control operation can precisely be performed, and thus, the effect of the stray light may be reduced to the minimum. The value of the rate P may be set to be substantially equal to 0.6 or more and less than 1.0.

Although each of the preceding sub-beam light-receiving portion SD1 and the succeeding sub-beam light-receiving portion SD2 is in an octagonal shape in an embodiment of the present invention as described above, if it is in a shape similar to each shape of the preceding sub-beam S1 and the succeeding sub-beam S2 formed by being applied to the preceding sub-beam light-receiving portion SD1 and the succeeding sub-beam light-receiving portion SD2, the effect of the stray light may further be reduced.

Figure 4:
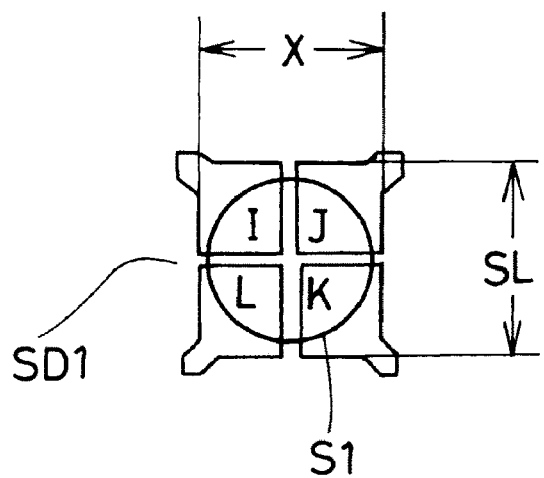
FIG. 4 is a diagram for explaining a relationship between a photodetector included in an optical pickup apparatus and a laser beam according to an embodiment of the present invention.
Figure 4:
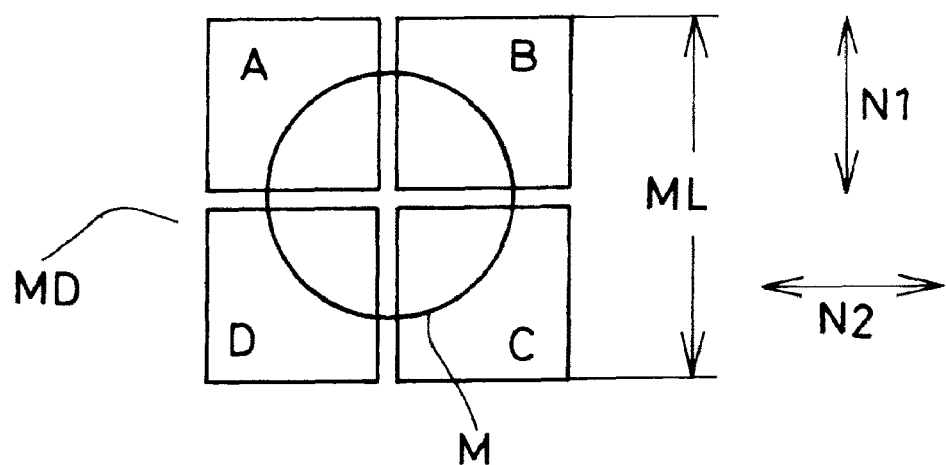
Figure 4:
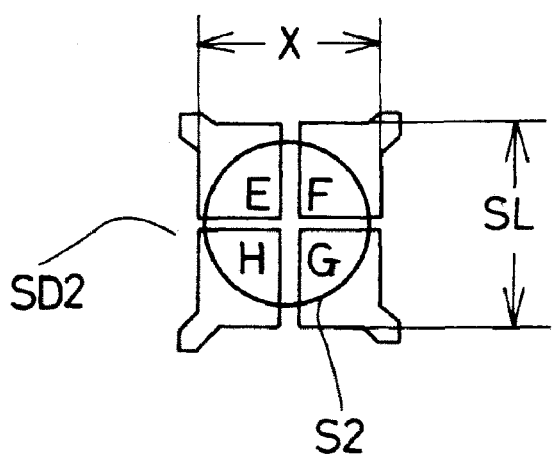

FIG. 4 is another embodiment, wherein the main-beam light-receiving portion MD is made up of a rectangular four-divided sensor, and each of the preceding sub-beam light-receiving portion SD1 and the succeeding sub-beam light-receiving portion SD2 is in such a shape that four sides of a rectangle forming the four-divided sensor are cut therefrom. When each of the preceding sub-beam light-receiving portion SD1 and the succeeding sub-beam light-receiving portion SD2 is in such a shape, the light-receiving areas of the preceding sub-beam light-receiving portion SD1 and the succeeding sub-beam light-receiving portion SD2 may be reduced, and thus, the effect of the stray light may be restrained.

In an embodiment according to the present invention, the length X of the preceding sub-beam light-receiving portion SD1 and the succeeding sub-beam light-receiving portion SD2 in the N2 direction is set to be substantially the same as the diameter of the sub-beams S1 and S2 as is the case with an embodiment of the present invention shown in FIG. 3. The length SL of the preceding sub-beam light-receiving portion SD1 and the succeeding sub-beam light-receiving portion SD2 in the N1 direction is set based on the rate P of the length SL relative to the length ML of the main-beam light-receiving portion in the N1 direction, as is the case with the above embodiment of the present invention. The setting based on the rate P is performed in the same manner as an embodiment of the present invention shown in FIG. 3 and will not be described.

In an embodiment of the present invention, a description is made for a case of implementation for the optical pickup apparatus performing an operation of reading signals recorded in a two-layer optical disc, however, implementation is possible for an optical pickup apparatus performing an operation of reading signals recorded in a multilayer optical disc including three or more signal recording layers.

In an embodiment of the present invention, a description is made for an operation whereby the effect is improved of the stray light reflected from a signal recording layer, for which the focusing control operation is not performed, in a two-layer optical disc, however, an operation whereby an effect of the unnecessary laser beam is improved may be performed in the focusing control operation for a single-layer optical disc.

Figure 6:
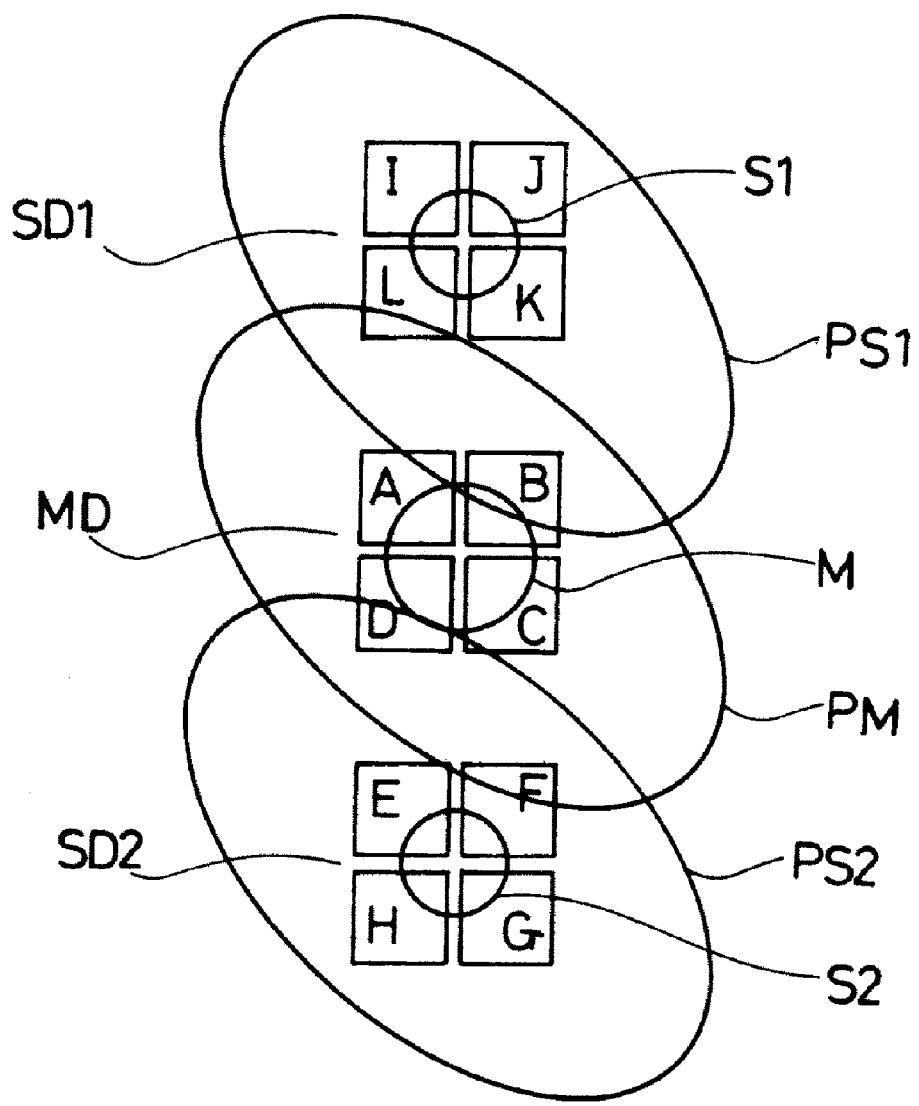
FIG. 6 is a diagram for explaining a relationship between a photodetector included in an optical pickup apparatus and a laser beam.

FIG. 6 depicts a relationship between the main-beam light-receiving portion MD, the preceding sub-beam light-receiving portion SD1, and the succeeding sub-beam light-receiving portion SD2 included in the photodetector in the optical pickup apparatus and the unnecessary light. While the focusing operation with the objective lens 8 is not performed, the main beam M, the preceding sub-beam S1, and the succeeding sub-beam S2 are not condensed on the main-beam light-receiving portion MD, the preceding sub-beam light-receiving portion SD1, and the succeeding sub-beam light-receiving portion SD2, and are applied to the light-receiving portions in an expanded state as shown with a main beam PM, a preceding sub-beam PS1, and a succeeding sub-beam PS2.

In such a light receiving state, effects of the sub-beams PS1 and PS2 applied to the main-beam light-receiving portion MD is negligible since the light amounts of the sub-beams are small as compared to the light amount of the main beam as described above, however, an effect of the main beam PM applied to the preceding sub-beam light-receiving portion SD1 and the succeeding sub-beam light-receiving portion SD2 is not negligible.

In an embodiment of the present invention, since the area of each of the preceding sub-beam light-receiving portion SD1 and the succeeding sub-beam light-receiving portion SD2 is rendered smaller than the area of the main-beam light-receiving portion MD, and the preceding sub-beam light-receiving portion SD1 and the succeeding sub-beam light-receiving portion SD2 are changed in shape and length as above, so that the effect of the main beam PM may be reduced, and thus, the focusing control operation and the tracking control operation may precisely be performed.

When comparing a case where each of the preceding sub-beam light-receiving portion SD1 and the succeeding sub-beam light-receiving portion SD2 are in an octagonal shape with a case where it is in a rectangular shape, a peak value of the focus error signal is reduced by about 10% in the case of the octagonal shape, however, it is confirmed that the focusing control operation in the optical pickup apparatus is performed without any trouble.

When performing the focus search operation in the optical pickup apparatus according to an embodiment of the present invention, i.e., when an optical disc is inserted in an optical disc apparatus and an operation is performed of moving the objective lens to the operational position, if the focusing control operation is performed using the astigmatic method that uses only the main beam M applied to the main-beam light-receiving portion MD, and the subsequent focusing control operation is performed using the differential astigmatic method that uses the preceding sub-beam S1 and the succeeding sub-beam S2 applied to the preceding sub-beam light-receiving portion SD1 and the succeeding sub-beam light-receiving portion SD2, an effect may be eliminated of improper irradiation with the main beam MD to the preceding sub-beam light-receiving portion SD1 and the succeeding sub-beam light-receiving portion SD2 when performing the focus search operation, and thus, the focusing control operation may precisely be performed.

Figure 7:
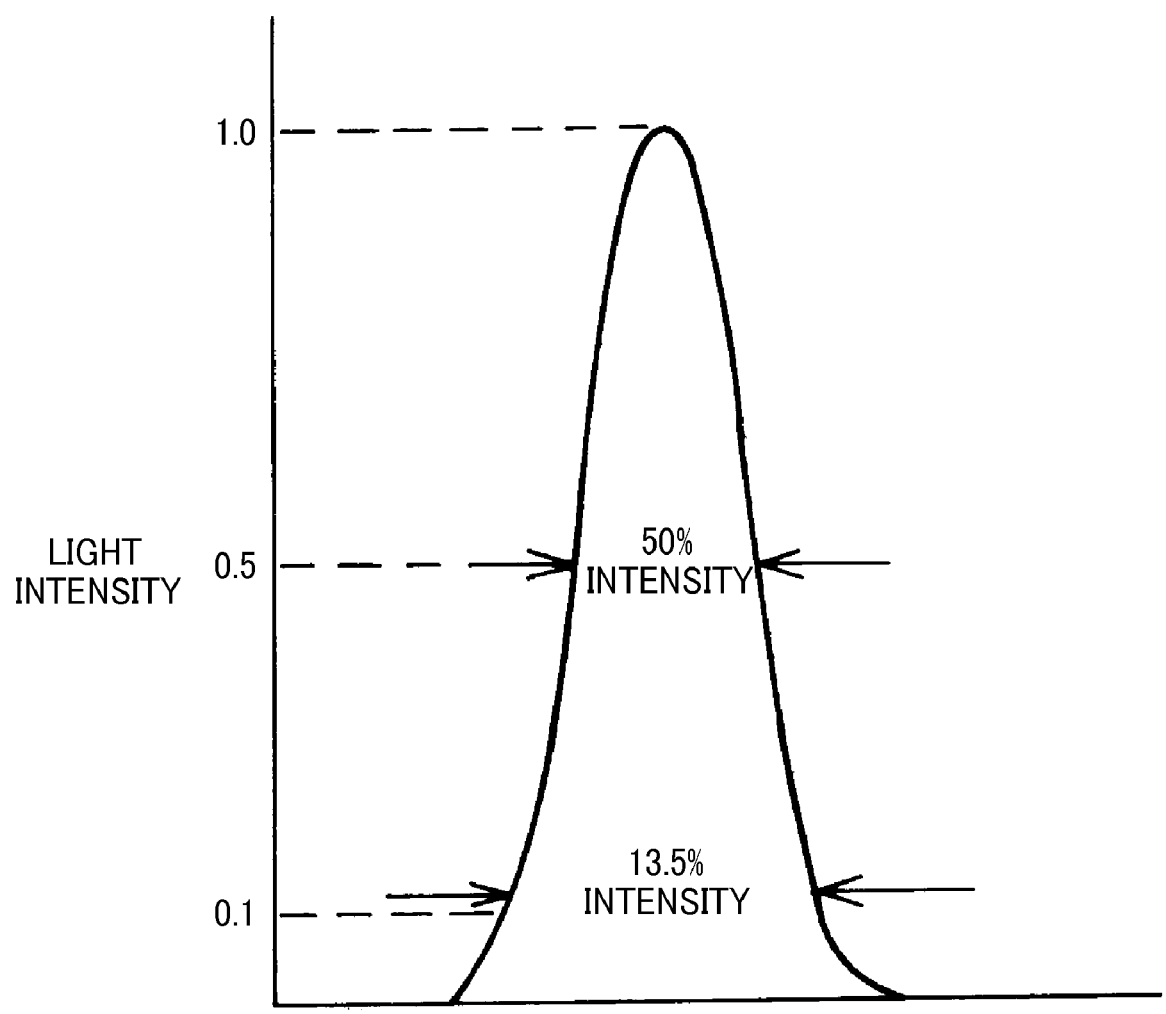
FIG. 7 is a characteristic diagram for explaining intensity distribution of a laser beam.

The photodetector 10 according to an embodiment of the present invention is made up as described above, and there will then be described a spot formed by return light applied to the main-beam light-receiving portion MD, the preceding sub-beam light-receiving portion SD1, and the succeeding sub-beam light-receiving portion SD2 included in the photodetector 10 with reference to a characteristic diagram shown in FIG. 7.

The laser beam emitted from the laser diode 1 has characteristics called Gaussian characteristics and FIG. 7 depicts intensity distribution characteristics of the laser beam having the Gaussian characteristics. In the optical pickup apparatus, there are set numerical aperture of a lens used in an optical system such as the objective lens 8 and the sensor lens 9, laser intensity required for performing the operation of reproducing signals recorded in the optical disc, and a diameter of a spot to be used to obtain the laser beam required for recording signals into the optical disc.

The diameter of the spot to be used is set within a range where necessary laser intensity is obtained according to the characteristic diagram of FIG. 7. For example, when the maximum intensity of the laser beam is set to 1.0, a spot diameter is so set as to use as the spot a portion of the laser beam whose intensity is greater than 0.5 that is intensity at a position of 50% of or a half of the maximum intensity, i.e., at a position corresponding to so-called half width, or the spot diameter is so set as to use as the spot a portion of the laser beam whose intensity is greater than 0.135 that is intensity at a position of 13.5% or $1/e^2$ (e is the base of natural logarithms) relative to the maximum intensity.

The spot diameter is set based on the laser intensity distribution as above, and the intensity range of the laser beam used as the spot is determined according to which is put on a higher priority among the size of the spot, the peak light intensity of the spot, and the full power of the spot.

In the above optical pickup apparatus, the spot diameter set based on the intensity distribution of the laser beam is set in consideration of power loss of the laser beam, and is so set as to use a portion of the laser beam whose intensity is greater than 13.5%, or $1/e^2$ relative to the maximum intensity of the laser beam. Since the spot diameter is set as above, if the length X of the preceding sub-beam light-receiving portion SD1 and the succeeding sub-beam light-receiving portion SD2 in the N2 direction making up the photodetector is set according to a range of the laser-beam intensity which determines the spot diameter, the sizes of the light-receiving portions used for generating the focus error signal and the tracking error signal may be set to be the smallest, and thus, the adverse effect of the stray light may be reduced to the minimum.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
a diffraction grating that a laser beam enters, the diffraction grating being configured to generate a main beam that is 0th order light and sub-beams that are +1st order diffracted light and −1st order diffracted light;
an objective lens configured to focus the main beam and the sub-beams onto a signal recording layer;
a main-beam light-receiving portion that the main beam reflected by the signal recording layer is applied to; and
sub-beam light-receiving portions that the sub-beams reflected by the signal recording layer are respectively applied to, each light-receiving area of the sub-beam light-receiving portions being smaller than a light-receiving area of the main-beam light-receiving portion,
wherein a length of the sub-beam light-receiving portions in a direction orthogonal to a tracking control direction is substantially the same as a diameter of a spot having intensity that is $1/e^2$ (e is the base of natural logarithms) relative to the maximum intensity of the sub-beams.

2. The optical pickup apparatus of claim 1, wherein
the main-beam light-receiving portion and the sub-beam light-receiving portions are arranged side by side in a tracking control direction, and wherein
a rate of a length of the sub-beam light-receiving portions in the tracking control direction to a length of the main-beam light-receiving portion in the tracking control direction is set to 0.6 or more and less than 1.0.

3. The optical pickup apparatus of claim 1, wherein
the main-beam light-receiving portion and the sub-beam light-receiving portions are arranged side by side in a tracking control direction, and wherein a rate of a length of the sub-beam light-receiving portions in the tracking control direction to a length of the main-beam light-receiving portion in the tracking control direction is set to substantially 0.6.

4. The optical pickup apparatus of claim 2, wherein
a ratio between the length of the main-beam light-receiving portion in the tracking control direction and the length of the sub-beam light-receiving portions in the tracking control direction is set based on an amount of reduction in a light reception amount of the sub-beams associated with displacement in the tracking direction.

5. The optical pickup apparatus of claim 1, wherein
each shape of the sub-beam light-receiving portions is made similar to each shape of the sub-beams.

6. The optical pickup apparatus of claim 1, wherein
each of the sub-beam light-receiving portions is in an octagonal shape.

7. The optical pickup apparatus of claim 1, wherein
each of the sub-beam light-receiving portions is in a shape elongated in a tracking control direction.

8. The optical pickup apparatus of claim 1, wherein
a focus error signal is generated from signals obtained from the sub-beam light-receiving portions and the main-beam light-receiving portion.

* * * * *